July 22, 1958 R. G. PERRY 2,843,870
SHOE SCRAPER AND RESIDUE COLLECTOR FOR VEHICLES
Filed May 3, 1956
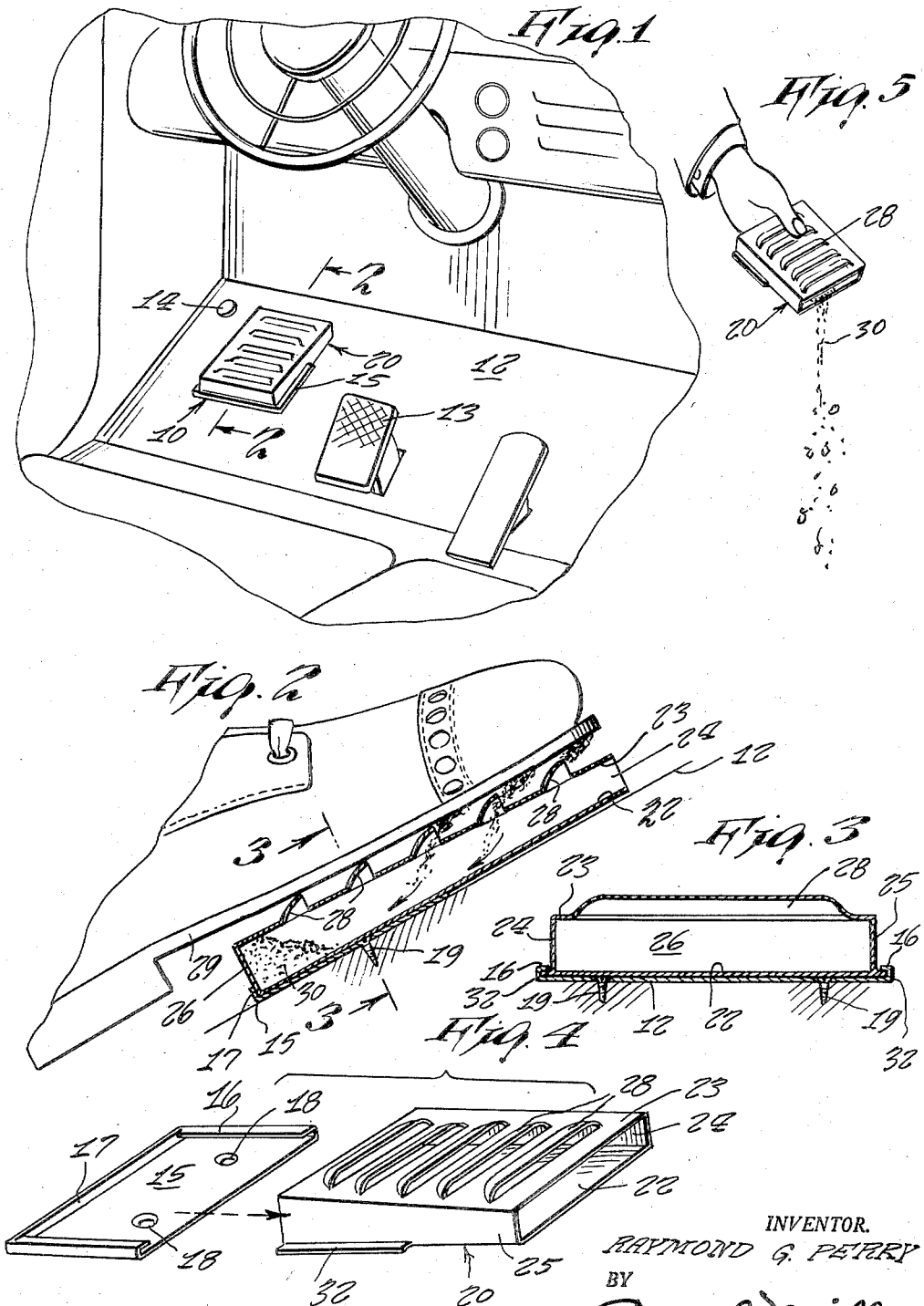
INVENTOR.
RAYMOND G. PERRY
BY
Carl Miller
ATTORNEY United States Patent Office 2,843,870
Patented July 22, 1958

1

2,843,870

SHOE SCRAPER AND RESIDUE COLLECTOR FOR VEHICLES

Raymond G. Perry, Cranston, R. I.

Application May 3, 1956, Serial No. 582,500

3 Claims. (Cl. 15—237)

This invention relates to a shoe scraper and, more particularly, to a shoe scraper adapted to retain the residue scraped from the shoe for mounting in a vehicle.

Aside from soiling and marring the appearance of the interior of the vehicle, dirt such as snow and mud that is carried into the vehicle by the driver, can cause accidents and damage to the vehicle. For example, if the driver of the vehicle were to attempt to apply his foot to the brake pedal and the shoe had a coating of slippery mud thereon, it would be possible for the shoe to slip off of the pedal whereby an accident might result. An object of this invention, therefore, is to provide a scraper for mounting in vehicles that is adapted to remove residue from the bottom of a driver's shoe that is simple in construction and efficient in operation.

Another object of this invention is to provide a shoe scraper for mounting in vehicles in which the residue is collected and stored therein and which is readily removable for emptying the contents thereof.

Still another object of this invention is to provide a shoe scraper for vehicles that is easily assembled therewith and which is readily accessible for cleaning and emptying.

All of the foregoing and still further objects and advantages of this invention will become apparent from a study of the following specification, taken in connection with the accompanying drawing, wherein:

Figure 1 is a perspective view showing a shoe scraper made in accordance with this invention, mounted in operative position inside of the automobile;

Figure 2 is a cross-sectional view taken along line 2—2 of Figure 1;

Figure 3 is a cross-sectional view taken along line 3—3 of Figure 2;

Figure 4 is an exploded perspective view of the device as shown in Figure 1; and Figure 5 is a view in perspective showing the device being emptied.

Referring now to Figure 1 of the drawing, a shoe scraper 10 is shown mounted in operative position on the floor boards 12 of an automotive vehicle between the brake pedal 13 and the light dimmer switch 14. As more clearly shown in Figures 2 and 4, the device includes a flat attachment plate 15 that is adapted to be secured to the floor of the vehicle by means of screws 19 which extend through tapered holes 18 in the attachment plate. If desired, adhesive means may be used to secure the attachment plate on the floor boards in place of the screws 19. The attachment plate has a flange 16 along each side thereof so as to form a U-shaped channel and has a vertical wall 17 disposed adjacent the lower extremity thereof. The main receptacle 20 is of box-like configuration and has a bottom wall 22, a top wall 23, and side walls 24, 25 connecting the respective bottom and top walls. At the lower extremity of the receptacle 20, is a back wall 26. The upper or front portion of the receptacle is open. Because of the tapered sides 24, 25 which secure the various parts of the receptacle together, the lower back portion of the receptacle is of substantially greater capacity than the upper reduced portion thereof. This is particularly of advantage in that the receptacle thereby provides ample storage space for residue that is gathered therein and since the upper end is of reduced dimension there is less likelihood that the

2 residue contained within the receptacle will be jarred loose by vibrations and movements of the vehicle which might otherwise cause them to be ejected out of the open end thereof. The top 23 of the receptacle is provided with a plurality of canopy-shaped collector scraper elements 28. Each of these scraper collector elements are disposed above the top surface of the top wall 23 and open outwardly and upwardly thereof so as to be operative to scrape any residue carried by the sole 29 of a shoe. A pair of securement flanges 32 are disposed along the bottoms of each side 24, 25, of the receptacle and are adapted to be received within the U-shaped channels provided by the flanges 16 of the attachment plate.

In operation, the attachment plate 15 is first secured in proper position on the floor boards of the vehicle, after which, the receptacle is assembled therewith by sliding the flanges 32 into the provided channels to a point where the back wall 26 abuts the vertical retaining wall 17 of the securement plate. In order to remove the residue from the sole of a shoe 29, the shoe is drawn downwardly across the scraper collector elements 28 whereupon the residue is deposited within the interior of the receptacle. Whenever it is desired to remove the residue, the receptacle 20 is disassembled from the attachment plate 15 whereupon the residue 30 contained therein may be discharged, as shown in Figure 5.

While this invention has been described with particular reference to the specific form shown in the drawing, it is to be understood that such is not to be construed as imparting limitations upon the invention, which is best defined by the claims appended hereto.

Having thus described my invention, I claim as new and desire to secure by letters Patent:

1. A scraper and residue collector and storage device comprising, in combination, a receptacle having a bottom wall, a pair of side walls, a lower back wall, and a top wall, one upper end of said receptacle opposite to said back wall being open, said side walls being tapered from a relatively wide dimension adjacent to said back wall to a relatively narrow dimension adjacent to said upper open end thereof, scraper means associated with said top wall for scraping residue from the sole of a shoe comprising a plurality of raised arcuate scraper and collector elements opening into said receptacle towards the lower end thereof, said scraper and collector elements having scraper edges facing toward said open upper end of said receptacle, and means for removably securing said receptacle upon the floor of a vehicle, whereby said top wall is angularly related to said vehicle floor.

2. A scraper and residue collector as set forth in claim 1, wherein said means for removably securing said receptacle comprises a plate adapted to be secured to the floor of the vehicle comprising opposed channel-shaped grooves, and said receptacle comprises flanges adapted to be slidably received within said grooves.

3. A scraper and residue collector as set forth in claim 2, wherein the interior of said receptacle adjacent to said back wall is adapted to receive and store residue removed from the sole of the shoe drawn across said scraper and collector elements, and said open end of said receptacle is adapted to discharge said residue when said receptacle is removed and tilted to a discharging position.

References Cited in the file of this patent

UNITED STATES PATENTS

| | | |
|---|---|---|
| 888,287 | Williams | May 19, 1908 |
| 2,308,587 | Connor | Jan. 19, 1943 |

FOREIGN PATENTS

| | | |
|---|---|---|
| 425,580 | Great Britain | Mar. 18, 1935 |